United States Patent
Kondo et al.

(10) Patent No.: US 12,054,151 B2
(45) Date of Patent: Aug. 6, 2024

(54) CONTROL DEVICE, CONTROL METHOD, AND VEHICLE

(71) Applicant: TOYOTA JIDOSHA KABUSHIKI KAISHA, Toyota (JP)

(72) Inventors: Yumi Kondo, Okazaki (JP); Yasuyuki Mikami, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 15 days.

(21) Appl. No.: 17/192,135

(22) Filed: Mar. 4, 2021

(65) Prior Publication Data
US 2021/0309224 A1    Oct. 7, 2021

(30) Foreign Application Priority Data

Apr. 3, 2020  (JP) .................. 2020-067636

(51) Int. Cl.
*B60W 30/18*    (2012.01)
*B60W 30/182*   (2020.01)
*B60W 40/04*    (2006.01)
*B60W 40/105*   (2012.01)

(52) U.S. Cl.
CPC .......... *B60W 30/18018* (2013.01); *B60W 30/18054* (2013.01); *B60W 30/182* (2013.01); *B60W 40/04* (2013.01); *B60W 40/105* (2013.01); *B60W 2554/406* (2020.02)

(58) Field of Classification Search
CPC ..... B60W 30/18018; B60W 30/18054; B60W 30/182; B60W 40/04; B60W 2554/406; B60W 2520/10; B60W 2556/10; B60W 40/105; B60T 2210/16; F02N 2200/0801; F02N 11/0837; F02N 2200/124; F02N 2200/125
USPC ......................................................... 701/93
See application file for complete search history.

(56) References Cited

U.S. PATENT DOCUMENTS

| | | | |
|---|---|---|---|
| 6,190,284 B1 | 2/2001 | Kuroda et al. | |
| 2014/0315684 A1* | 10/2014 | Bureau | F02N 11/0837 477/107 |
| 2015/0142265 A1* | 5/2015 | Killy | B60W 10/06 701/41 |
| 2015/0203117 A1* | 7/2015 | Kelly | B60W 40/06 701/91 |

(Continued)

FOREIGN PATENT DOCUMENTS

| | | |
|---|---|---|
| CN | 104718114 A | 6/2015 |
| JP | H09-170917 A | 6/1997 |

(Continued)

*Primary Examiner* — Scott A Reinbold

(57) ABSTRACT

An electronic control unit is a control device for controlling a vehicle including a vehicle speed sensor. The electronic control unit is configured to identify a section from start to stop of the vehicle using a vehicle speed detected by the vehicle speed sensor, determine whether the number of times of a low-speed section is more than a prescribed number of times, the low-speed section being the identified section where a representative value of the vehicle speed is less than a prescribed speed, and determine that the vehicle is in a specific situation where low-speed travel is inevitable, when it is determined that the number of times of the low-speed section is more than the prescribed number of times.

6 Claims, 8 Drawing Sheets

(56) References Cited

U.S. PATENT DOCUMENTS

| | | | | |
|---|---|---|---|---|
| 2015/0219060 A1* | 8/2015 | Nakashima | ............. | F02D 17/00 |
| | | | | 701/103 |
| 2016/0103226 A1* | 4/2016 | Inoue | ................... | G08G 1/0133 |
| | | | | 342/357.35 |
| 2017/0291606 A1* | 10/2017 | Yamada | .......... | B60W 30/18072 |
| 2020/0207352 A1* | 7/2020 | Ogawa | ................ | B60W 40/068 |
| 2021/0188264 A1 | 6/2021 | Okuda et al. | | |

FOREIGN PATENT DOCUMENTS

| | | | |
|---|---|---|---|
| JP | H11257121 A | | 9/1999 |
| JP | 2000356147 A | | 12/2000 |
| JP | 2005091112 A | * | 4/2005 |
| JP | 2005091112 A | | 4/2005 |
| JP | 2014125982 A | | 7/2014 |
| JP | 2014526636 A | | 10/2014 |
| WO | 2013/037777 A1 | | 3/2013 |
| WO | 2014027111 A1 | | 2/2014 |
| WO | 2019220717 A1 | | 11/2019 |

\* cited by examiner

CONTROL DEVICE, CONTROL METHOD, AND VEHICLE

CROSS-REFERENCE TO RELATED APPLICATION

This application claims priority to Japanese Patent Application No. 2020-067636 filed on Apr. 3, 2020, incorporated herein by reference in its entirety.

BACKGROUND

1. Technical Field

This disclosure relates to control devices, vehicles, and control methods, and particularly relates to a control device for controlling a vehicle including a vehicle speed sensor, a control method therefor, and the vehicle.

2. Description of Related Art

Some vehicles conventionally include an engine stop-restart system (also called a stop-start system or a stop-and-start system). The engine stop-restart system stops idling of the engine when vehicle speed decreases to a specific speed (for example, 0 km per hour), and also restarts the engine when an operation of a brake pedal is released or an accelerator pedal is operated. Such an engine stop-restart system can curb fuel costs.

There have been four-wheel drive vehicles including a transfer. The transfer is a mechanism for distributing drive force of the engine to a front wheel side and a rear wheel side. Some transfers further include a mechanism for switching a reduction ratio between a low range mode that is suitable for off-road travel and a high range mode that is suitable for on-road travel. Switching to the low range mode improves off-road travel performance.

In a vehicle including such an engine stop-restart system and a transfer, various harmful effects may be generated when the engine is stopped by the engine stop-restart system due to the vehicle speed becoming lower than a prescribed speed, while the vehicle is driving on an off-road with the transfer being switched to the low range mode. Examples of the harmful effects are as follows. Movement of the vehicle becomes unstable as the drive force is not transmitted to the wheels. The engine brake tends to become less effective. In the case of a vehicle including a brake using negative pressure of the engine, braking operation requires stronger force. Furthermore, In the case of a vehicle including a power steering system that uses an engine output, steering operation requires stronger force.

In order to prevent the driver from being disturbed by the harmful effects, some vehicles prohibit operation of the engine stop-restart system, when the transfer is switched to the low range mode (see, for example, Published Japanese Translation of PCT application No. 2014-526636).

SUMMARY

However, in the vehicle disclosed in JP-A-2014-526636, when the transfer is switched to the low range mode, operation of the engine stop-restart system is prohibited even while the vehicle travels on an on-road instead of an off-road, and therefore, fuel costs cannot be curved. Accordingly, there are demands for determining whether the vehicle is really in the situation where low-speed travel such as off-road travel is inevitable, even when the transfer is switched to the low range mode.

There is also a problem in that cost increase may be caused by using cameras, and expensive sensors or the like, for measuring the behavior of a vehicle to distinguish the off-road and the on-road.

This disclosure has been made in order to solve these problems, and an object of the disclosure is to provide a vehicle control device, a control method, and a vehicle, capable of determining the situation where low-speed travel is inevitable, while restraining cost increase.

A control device according to this disclosure controls a vehicle including a vehicle speed sensor. The control device is configured to identify a section from start to stop of the vehicle using a vehicle speed detected by the vehicle speed sensor, determine whether the number of times of a low-speed section is more than a prescribed number of times, the low-speed section being the identified section where a representative value of the vehicle speed is less than a prescribed speed, and determine that the vehicle is in a specific situation where low-speed travel is inevitable, when it is determined that the number of times of the low-speed section is more than the prescribed number of times.

According to such configuration, by simply using the vehicle speed detected by the vehicle speed sensor, it is possible to determine that the vehicle is in the situation where low-speed travel is inevitable, in the case where low-speed travel section continues, that is, the number of times of the low-speed section is more than a prescribed number of times, the low-speed section being a section from start to stop of the vehicle, in which the representative value speed is less than a prescribed speed. As a result, it is possible to provide a vehicle control device capable of determining the situation where low-speed travel is inevitable, while restraining cost increase.

For example, in the specific situation, the vehicle may travel on a low stability road surface. According to such configuration, it is possible to determine, while restraining cost increase, the situation where the vehicle is traveling on a low stability road surface, so that low-speed travel is inevitable.

The vehicle may further include a switching device for switching a travel mode to any one mode including a specific mode that is for traveling on the low stability road surface. The control unit may be configured to determine whether the switching device switches the travel mode to the specific mode, and determine that the vehicle is in the specific situation, when it is determined that the number of times of the low-speed section is more than the prescribed number of times and that the travel mode is switched to the specific mode.

According to such configuration, when the travel mode is switched to the specific mode for traveling on a low stability road surface in the situation where there is a high possibility that the vehicle travels on the low stability road surface, it is possible to determine, while restraining cost increase, the situation where the vehicle is traveling on the low stability road surface, so that low-speed travel is inevitable.

For example, in the specific situation, the vehicle may travel on a congested road. According to such configuration, it is possible to determine, while restraining cost increase, the situation where the vehicle travels on the congested road, so that low-speed travel is inevitable.

The vehicle may further include an engine, and an engine stop-restart system configured to stop idling of the engine when the vehicle speed lowers to a specific speed, and restart the engine when an operation for moving the vehicle is input. The control device may prohibit operation of the engine stop-restart system, when it is determined that the vehicle is in the specific situation.

According to such configuration, when it is determined that the vehicle is in the situation where low-speed travel is inevitable, operation of the engine stop-restart system can be prohibited. As a result, it is possible to prevent a driver from being disturbed by the harmful effects generated by stop of the engine in the situation where low-speed travel is inevitable.

The control device may be configured to determine whether the number of times that a high-speed section continues is more than a specific number of times, the high-speed section being a section where the representative value exceeds the prescribed speed, and determine that the vehicle is no longer in the specific situation, when it is determined that the number of times that the high-speed section continues is more than the specific number of times after the vehicle is determined to be in the specific situation.

According to such configuration, by simply using the vehicle speed detected by the vehicle speed sensor, it is possible to determine that the vehicle is not in the situation where low-speed travel is inevitable, in the case where the low-speed travel section is not continuous, that is, the number of times that the high-speed section continues is more than a specific number of times, the high-speed section being a section from start to stop of the vehicle, in which the representative value exceeds the prescribed speed. As a result, it is possible to determine that the vehicle is not in the situation where low-speed travel is inevitable, while restraining cost increase.

According to another aspect of the disclosure, a control method is a control method performed by a control device for controlling a vehicle including a vehicle speed sensor. The control method includes the steps of: the control device identifying a section from start to stop of the vehicle using a vehicle speed detected by the vehicle speed sensor, determining whether the number of times of a low-speed section is more than a prescribed number of times, the low-speed section being the identified section where a representative value of the vehicle speed is less than a prescribed speed, and determining that the vehicle is in a specific situation where low-speed travel is inevitable, when it is determined that the number of times of the low-speed section is more than the prescribed number of times.

According to such configuration, it is possible to provide a vehicle control method capable of determining the situation where low-speed travel is inevitable, while restraining cost increase.

According to still another aspect of the disclosure, a vehicle includes a vehicle speed sensor and a control device for controlling the vehicle. The control device is configured to identify a section from start to stop of the vehicle using a vehicle speed detected by the vehicle speed sensor, determine whether the number of times that a low-speed section continues is more than a prescribed number of times, the low-speed section being the identified section where a representative value of the vehicle speed is less than a prescribed speed, and determine that the vehicle is in a specific situation where low-speed travel is inevitable, when it is determined that the number of times of the low-speed section is more than the prescribed number of times.

According to such configuration, it is possible to provide a vehicle capable of determining the situation where low-speed travel is inevitable, while restraining cost increase.

According to the disclosure, it is possible to provide a control device, a control method, and a vehicle, capable of determining the situation where low-speed travel is inevitable, while restraining cost increase.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
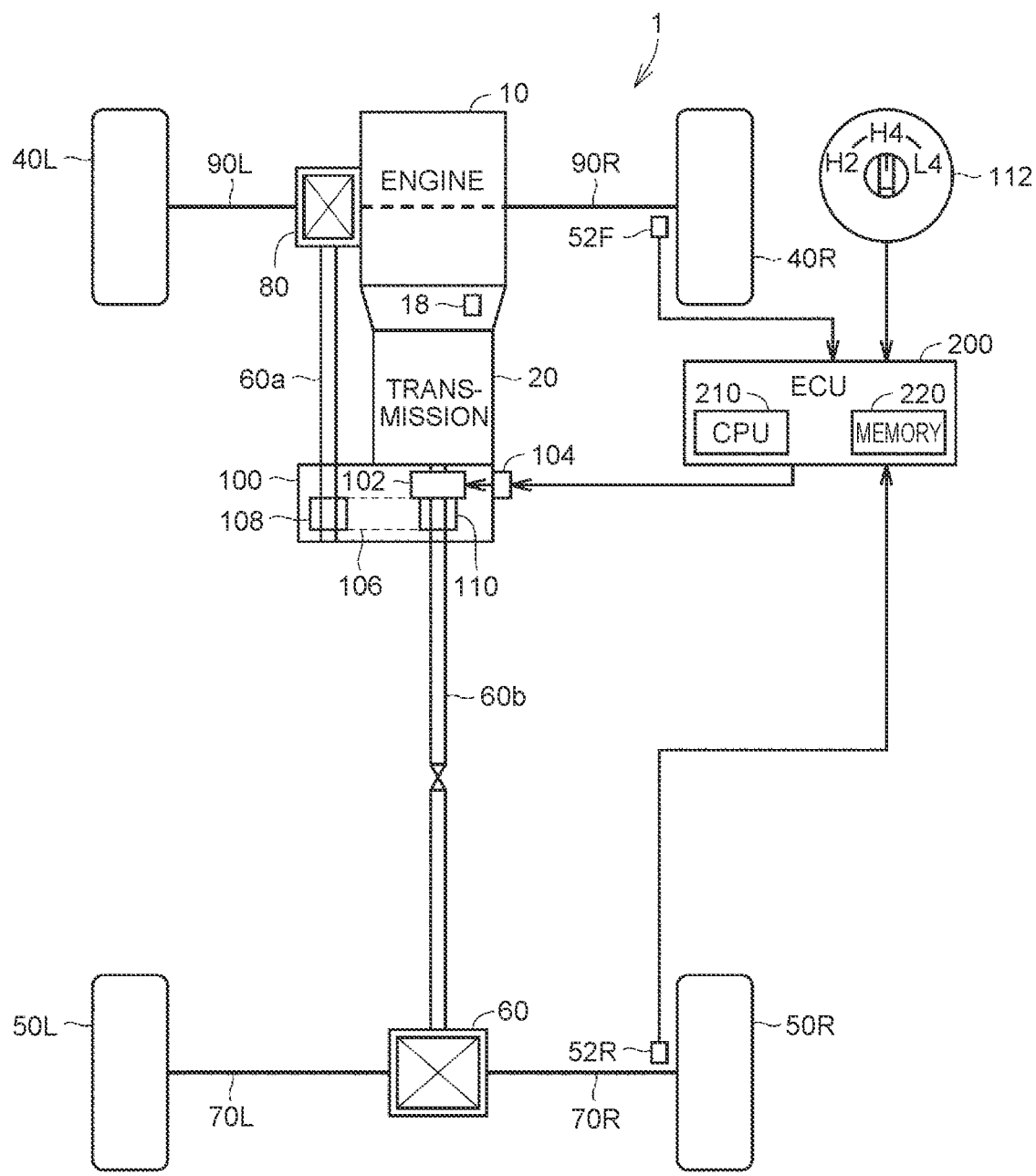
FIG. 1 shows an outline of a vehicle according to an embodiment of the disclose.

Hereinbelow, an embodiment of the present disclosure will be described in detail with reference to the drawings. Note that identical or like component members are designated by identical reference numerals to omit the description thereof.

FIG. 1 shows an outline of a vehicle according to the embodiment of the disclosure. With reference to FIG. 1, a vehicle 1 includes an engine 10, a transmission 20, front wheels 40R, 40L, rear wheels 50R, 50L, differential gears 60, 80, propeller shafts 60a, 60b, rear driveshafts 70R, 70L, front driveshafts 90R, 90L, a transfer 100, and an electronic control unit (ECU) 200.

The engine 10 generates motive power by combusting air-fuel mixture, which is made up of intake air and fuel that is injected from a fuel injection device (not illustrated), in a cylinder. The engine 10 has an output shaft coupled with the transmission 20. The motive power generated in the engine 10 is transferred to the transmission 20. The output of the engine 10 is controlled based on a control signal from the ECU 200.

The transmission 20 shifts the motive power from the engine 10, and transfers the shifted motive power to the transfer 100. In the present embodiment, the transmission 20 is illustrated as an automatic transmission. However, the transmission 20 is not limited to the automatic transmission, and may be a manual transmission, for example. The automatic transmission may also be a stepped automatic transmission having a plurality of gear stages, and may be a continuously variable automatic transmission which changes a gear ratio in a continuous manner.

In the present embodiment, the transmission 20 is operated by selecting any one range out of a plurality of travel ranges (a plurality of forward ranges (for example, D, L, 2), a reverse range (for example, R)) and a neutral (N) range.

The ECU 200 executes automatic shift control of the transmission 20 to cause the transmission 20 to operate in the travel range corresponding to the selected range.

The transfer 100 is serially coupled with the output shaft of the transmission 20. When the vehicle 1 is driven in a two-wheel-drive mode, the transfer 100 transmits to the propeller shaft 60*b* the motive power which is input from the engine 10 through the transmission 20. When the vehicle 1 is driven in a four-wheel-drive mode, the transfer 100 transmits the motive power input from the transmission 20 in distribution to the propeller shafts 60*a*, 60*b*.

The transfer 100 includes a sprocket 108 coupled with the output shaft of the transmission 20 and the propeller shaft 60*a*, a sprocket 110 coupled with the propeller shaft 60*b*, a chain 106 wound around the sprockets 108, 110, and a power transmission mechanism 102 which transmits the motive power input from the transmission 20 to the sprocket 110 or interrupts transmission to the sprocket 110. In the transfer 100, hydraulic fluid is stored.

The power transmission mechanism 102 transmits the motive power input from the transmission 20 to the sprocket 110, or interrupts transmission to the sprocket 110 by operation of an actuator 104. The actuator 104 may operate with hydraulic pressure, and may be a motor or the like, for example.

When the power transmission mechanism 102 transmits an input from the transmission 20 to the sprocket 110, the motive power input from the transmission 20 is transmitted to the propeller shaft 60*a* through the propeller shaft 60*b* and the chain 106, so that the vehicle is put in a four-wheel-drive mode.

Meanwhile, when the power transmission mechanism 102 interrupts transmission of the motive power from the transmission 20 to the sprocket 110, the motive power input from the transmission 20 is transmitted only to the propeller shaft 60*b* without through the chain 106, so that the vehicle is put in a two-wheel-drive mode.

The power transmission mechanism 102 is also a sub transmission to switch between a high-speed output mode (High mode) and a low-speed output mode (Low mode) by operation of the actuator 104. In the High mode, an input from the transmission 20 is shifted at a first gear ratio, and the shifted input is transmitted to the propeller shafts 60*a*, 60*b*. In the Low mode, an input from the transmission 20 is shifted at a second gear ratio that is lower than the first gear ratio, and the shifted output is transmitted to the propeller shafts 60*a*, 60*b*.

The motive power transmitted to the propeller shaft 60*b* goes to the rear-side differential gear 60, and is then transmitted to the rear wheels 50R, 50L through the rear driveshafts 70R, 70L.

When the vehicle 1 is in the four-wheel-drive mode, the motive power transmitted to the propeller shaft 60*a* goes to the front-side differential gear 80, and is then transmitted to the front wheels 40R, 40L through the front driveshafts 90R, 90L.

When the vehicle 1 performs turn-traveling, the differential gears 80, 60 absorb rotation speed difference between the right and left front wheels 40R, 40L or the right and left rear wheels 50R, 50L, respectively.

The ECU 200 includes a central processing unit (CPU) 210 and a memory 220. The memory 220 stores various programs executed by the CPU 210 and data which are used to control the vehicle 1, as well as data for execution of the programs. The ECU 200 is connected to an engine speed sensor 18, a wheel speed sensor 52F of the front wheels 40R, 40L, a wheel speed sensor 52R of the rear wheels 50R, 50L, and a transfer switch 112.

The engine speed sensor 18 detects speed of the output shaft of the engine (hereinafter stated as engine speed). The engine speed sensor 18 transmits a signal indicating the detected engine speed to the ECU 200.

The wheel speed sensors 52F, 52R detect the rotation speeds of the front wheel 40R and the rear wheel 50R, respectively (hereinafter stated as a front wheel speed and a rear wheel speed, respectively). The wheel speed sensors 52F, 52R transmit to the ECU 200 signals indicating the detected front wheel speed and rear wheel speed, respectively. In the vehicle 1 shown in FIG. 1, the wheel speed sensors 52F, 52R are provided. However, one of the wheel speed sensors 52F, 52R may be provided instead. The ECU 200 calculates a vehicle speed based on the received front wheel speed and rear wheel speed, and the diameter of tires.

The transfer switch 112 is operable by a driver to switch the mode of the power transmission mechanism 102 to one of an H2 mode, an H4 mode and an L4 mode. In the H2 mode, the High mode and the two-wheel-drive mode are asserted. In the H4 mode, the High mode and the four-wheel-drive mode are asserted. In the L4 mode, the Low mode and the four-wheel-drive mode are asserted. The transfer switch 112 transmits a signal indicating the switched mode to the ECU 200.

The ECU 200 has an engine stop-restart function. With the engine stop-restart function, idling of the engine 10 is stopped when the vehicle speed calculated based on the wheel speeds from the wheel speed sensors 52F, 52R lowers to a specific speed at which the vehicle 1 is considered to be stopped (which may be 0 km per hour, or 10 km per hour, for example), and the engine 10 is restarted when an operation of a brake pedal is released or an accelerator pedal is operated. A system controlled by the engine stop-restart function of the ECU 200 to stop idling of the engine 10 or restart the engine 10 (a system including the ECU 200, the engine 10, a starter motor, and a battery) is referred to as an engine stop-restart system.

First Embodiment

Assume the case where the vehicle speed of the vehicle 1 configured as described above lowers to a specific speed, while the vehicle 1 is traveling on an off-road with the transfer 100 being switched to the Low mode. In this case, if the engine stop-restart system stops the engine, various harmful effects are generated. For example, movement of the vehicle 1 becomes unstable since the drive force is not transmitted to the front wheels 40R, 40L and the rear wheels 50R, 50L. The engine brake tends to become less effective. In the case of the vehicle 1 including a brake using negative pressure of the engine 10, braking operation requires stronger force. Furthermore, in the case of the vehicle 1 including a power steering system that uses an output of the engine 10, steering operation requires stronger force.

In order to prevent the driver from being disturbed by the harmful effects, it is considered to prohibit operation of the engine stop-restart system, when the transfer is switched to the Low mode.

However, when the transfer is switched to the Low mode, operation of the engine stop-restart system is prohibited even while the vehicle is traveling on an on-road and not on an off-road. Hence, fuel costs cannot be curved. Accordingly, there are demands for determining whether the vehicle is really in the situation where low-speed travel such as off-road travel is inevitable even when the transfer is switched to the Low mode.

There is also a problem in that cost increase may be caused by using cameras, and expensive sensors or the like, for measuring the behavior of a vehicle in order to distinguish the off-road and the on-road.

Accordingly, in this embodiment, the ECU 200 identifies a section from start to stop of the vehicle 1 using the vehicle speed detected by the wheel speed sensors 52F, 52R, determines whether the number of times of a low-speed section is more than a prescribed number of times, the low-speed section being the identified section where a representative value of the vehicle speed is less than a prescribed speed, and determines that the vehicle 1 is in a specific situation where low-speed travel is inevitable, when it is determined that the number of times of the low-speed section is more than the prescribed number of times.

Accordingly, by simply using the vehicle speed detected by the wheel speed sensors 52F, 52R, it is possible to determine that the vehicle is in the situation where low-speed travel is inevitable, in the case where the low-speed travel section continues, that is, the number of times of the low-speed section is more than a prescribed number of times, the low-speed section being a section from start to stop of the vehicle 1, in which the representative value is less than a prescribed speed. As a result, it is possible to determine the situation where low-speed travel is inevitable, while restraining cost increase.

Figure 2:
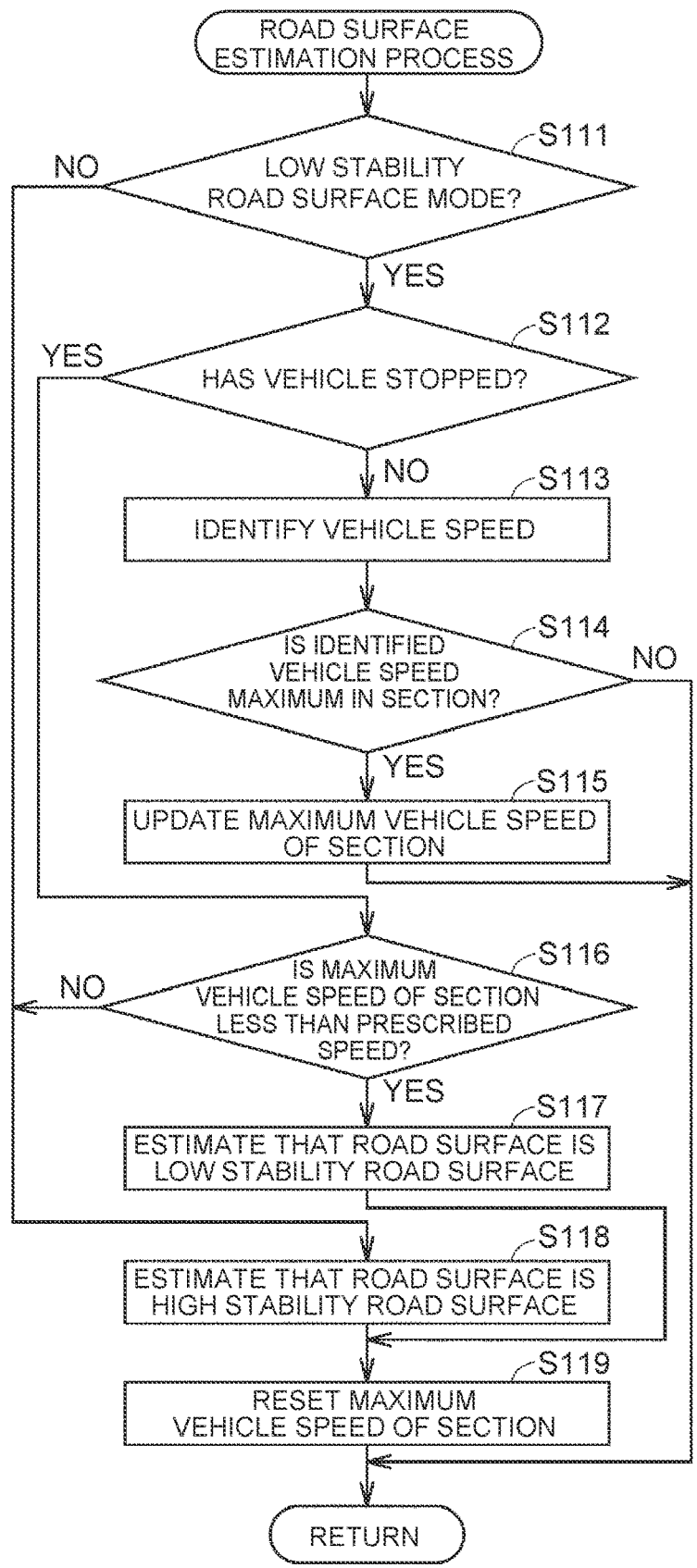
FIG. 2 is a flowchart showing the flow of a road surface estimation process in a first embodiment.

FIG. 2 is a flowchart showing the flow of a road surface estimation process in the first embodiment. With reference to FIG. 2, the ECU 200 calls and executes the processes of the road surface estimation process for every prescribed period in an order from the high order step.

In the road surface estimation process, the CPU 210 of the ECU 200 determines whether the transfer 100 is switched to a low stability road surface mode (L4 mode in this embodiment) (step S111).

Figure 3:
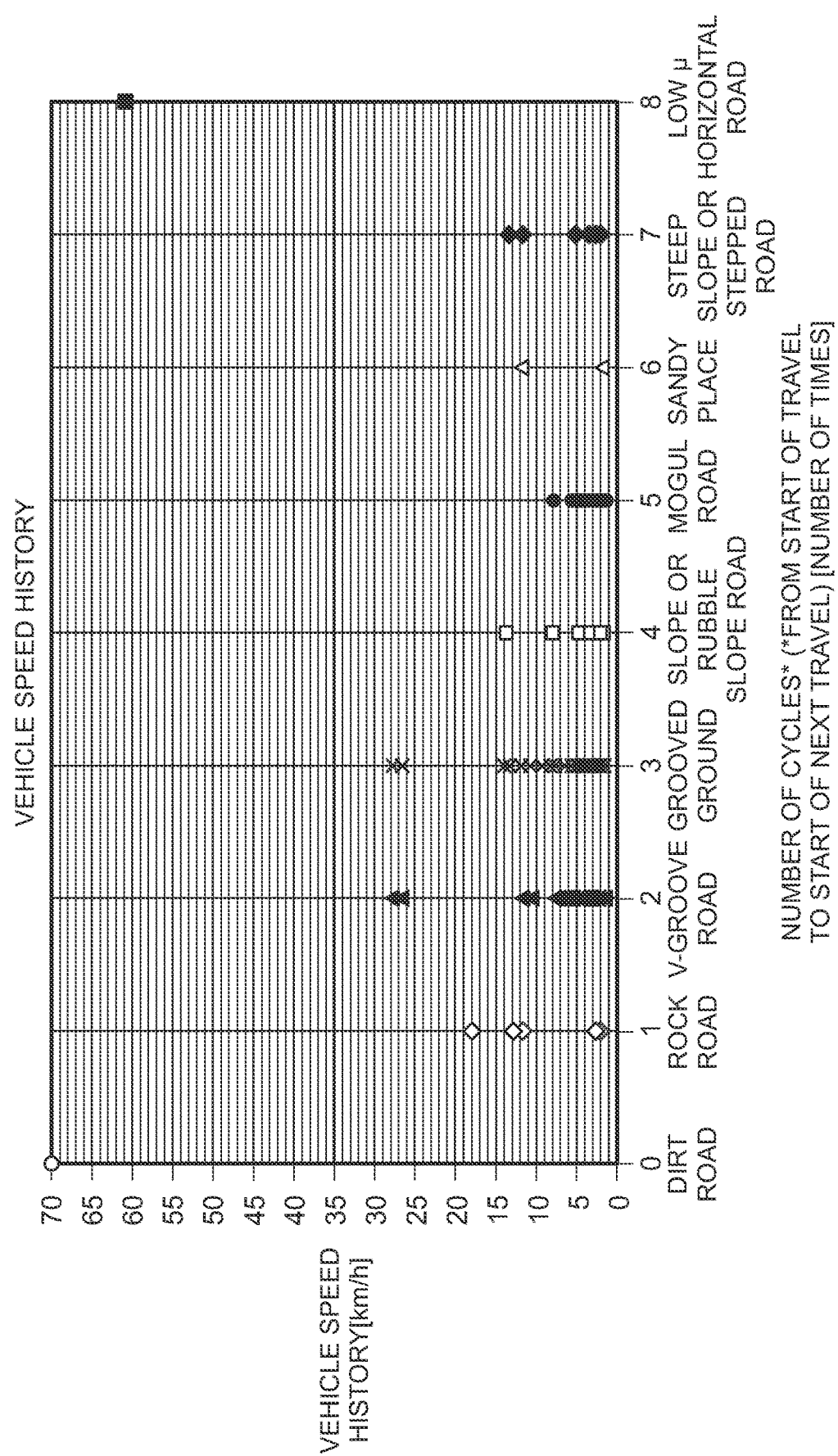
FIG. 3 shows a relation between road surface states and vehicle speed.

FIG. 3 shows a relation between road surface states and vehicle speed. With reference to FIG. 3, each plot indicates a maximum vehicle speed in each corresponding section from start to stop of the vehicle 1. A vertical axis represents the vehicle speed. A horizontal axis represents the road surface state. The road surface state to be tested includes the states of a dirt road, a rock road, a V-groove road, a grooved ground, a slope or rubble slope road, a mogul road, a sandy ground, a steep slope or stepped road, and a low μ horizontal road.

The dirt road, which is a road that is unpaved, has a flat road surface made of soil. The rock road is a road having a road surface made of rocks. The V-groove road has a V-shaped groove in cross section that is perpendicular to an advancing direction of the vehicle 1. The grooved ground has a groove that crosses the road that the vehicle advances. The slope in the slope or rubble slope road has a road surface on which the vehicle leans sideways. The rubble slope is covered with rubble articles such as small rocks, rocks, or concrete pieces. The mogul road has lump-like ruggedness on the road surface. The sandy ground has a ground surface made of sand. The steep slope road in the steep slope or stepped road is an ascending or descending road with a steep gradient. The stepped road has a step that crosses the road that the vehicle advances. The low μ horizontal road is a horizontal road having a low friction coefficient μ.

As shown in FIG. 3, in the section from start to stop of the vehicle 1, a maximum vehicle speed of 35 km/h or more is marked only on the dirt road and the low μ horizontal road.

In the section from start to stop of the vehicle 1, the maximum vehicle speed does not exceed 35 km/h on other road surfaces (the rock road, the V-groove road, the grooved ground, the slope or rubble slope road, the mogul road, the sandy place, the steep slope or stepped road). In this embodiment, the road surface of the rock road, V-groove road, grooved ground, slope or rubble slope road, mogul road, sandy place, and steep slope or stepped road is called "low stability road surface". In contrast, the road surface of a paved road in addition to the dirt road and the low μ horizontal road is called "high stability road surface" on which the vehicle 1 can stably travel as compared with the low stability road surface.

Returning to FIG. 2, when it is determined that the transfer 100 is switched to a low stability road surface mode (YES in step S111), the CPU 210 determines whether the vehicle 1 has stopped using signals from the wheel speed sensors 52F, 52R (step S112). When it is determined that the vehicle 1 does not stop (NO in step S112), the CPU 210 identifies a current vehicle speed using signals from the wheel speed sensors 52F, 52R (step S113).

Next, the CPU 210 determines whether the identified vehicle speed is the maximum in the current section from start to stop of the vehicle 1 (step S114). When it is determined that the identified vehicle speed is the maximum in the current section (YES in step S114), the CPU 210 updates the maximum vehicle speed of the current section to the identified vehicle speed (step S115).

When it is determined that the identified vehicle speed is not the maximum in the current section (NO in step S114), or after execution of step S115, the CPU 210 returns the process to be executed to the high-order process of the caller of the road surface estimation process.

When it is determined that the vehicle 1 has stopped (YES in step S112), the CPU 210 determines whether the maximum vehicle speed in this present section from start to stop of the vehicle 1 is less than a prescribed speed (in this embodiment, 35 km/h shown in FIG. 3), the prescribed speed being a threshold value used to distinguish the low stability road surface and the high stability road surface (step S116). When it is determined that the maximum vehicle speed of the present section is less than the prescribed speed (YES in step S116), the CPU 210 estimates that the present section and the section for some time in the future have a low stability road surface (step S117).

When it is determined that the maximum vehicle speed in the present section is not less than the prescribed speed (NO in step S116), or when it is determined that the transfer 100 is not switched to the low stability road surface mode (NO in step S111), the CPU 210 estimates that the present section and the section for a while in the future have a high stability road surface (step S118).

After step S117 or step S118, the CPU 210 resets the maximum vehicle speed in the present section to zero (step S119). Then, the CPU 210 returns the process to be executed to the high-order process of the caller of the road surface estimation process.

Figure 4:
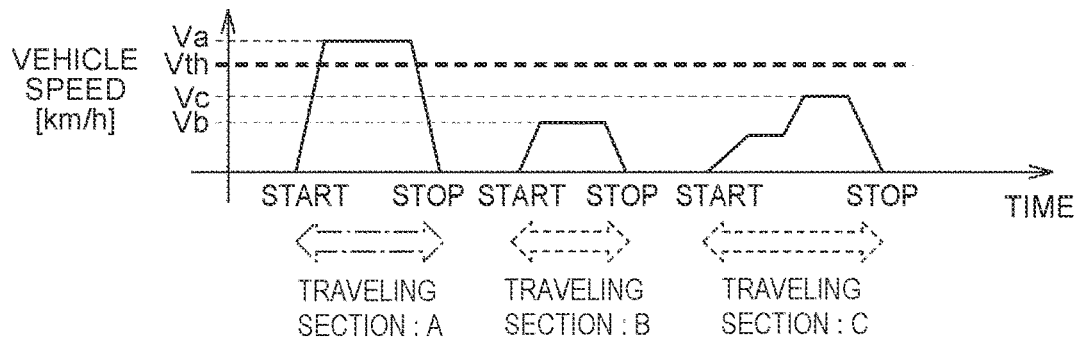
FIG. 4 shows a travel example for illustrating the road surface estimation process in the first embodiment.

FIG. 4 shows a travel example for illustrating the road surface estimation process in the first embodiment. With reference to FIG. 4, when the transfer 100 is in the low stability road surface mode during travel in a traveling section A, step S112 to step S115 of FIG. 2 are executed. Eventually, the maximum vehicle speed of the section is updated to Va (km/h).

At the time of stop in the traveling section A, it is determined that the maximum vehicle speed Va (km/h) is not less than the prescribed speed Vth (km/h) in step S116 of FIG. 2. Hence, in step S118, the traveling section A and the subsequent section are estimated to have a high stability road surface.

When the transfer 100 is in the low stability road surface mode during travel in a traveling section B, step S112 to step S115 of FIG. 2 are executed. Eventually, the maximum vehicle speed of the section is updated to Vb (km/h).

At the time of stop in the traveling section B, it is determined that the maximum vehicle speed Vb (km/h) is less than the prescribed speed Vth (km/h) in step S116 of FIG. 2. Hence, in step S117, the traveling section B and the subsequent section are estimated to have a low stability road surface.

Since a traveling section C has a low stability road surface, the estimation made at the time of stop in the traveling section B is correct. Thus, on the low stability road surface, there is a tendency that start and stop are frequently repeated in a short period of time. Hence, the estimation that the subsequent section has a low stability road surface is more likely to be correct.

Modification of First Embodiment

In the first embodiment, a program indicated as the road surface estimation process shown in FIG. 2, i.e., software, is executed by the ECU 200 to estimate the state of the road surface. In a modification of the first embodiment, the road surface estimation process shown in FIG. 2 is implemented by a hardware circuit.

Figure 5:
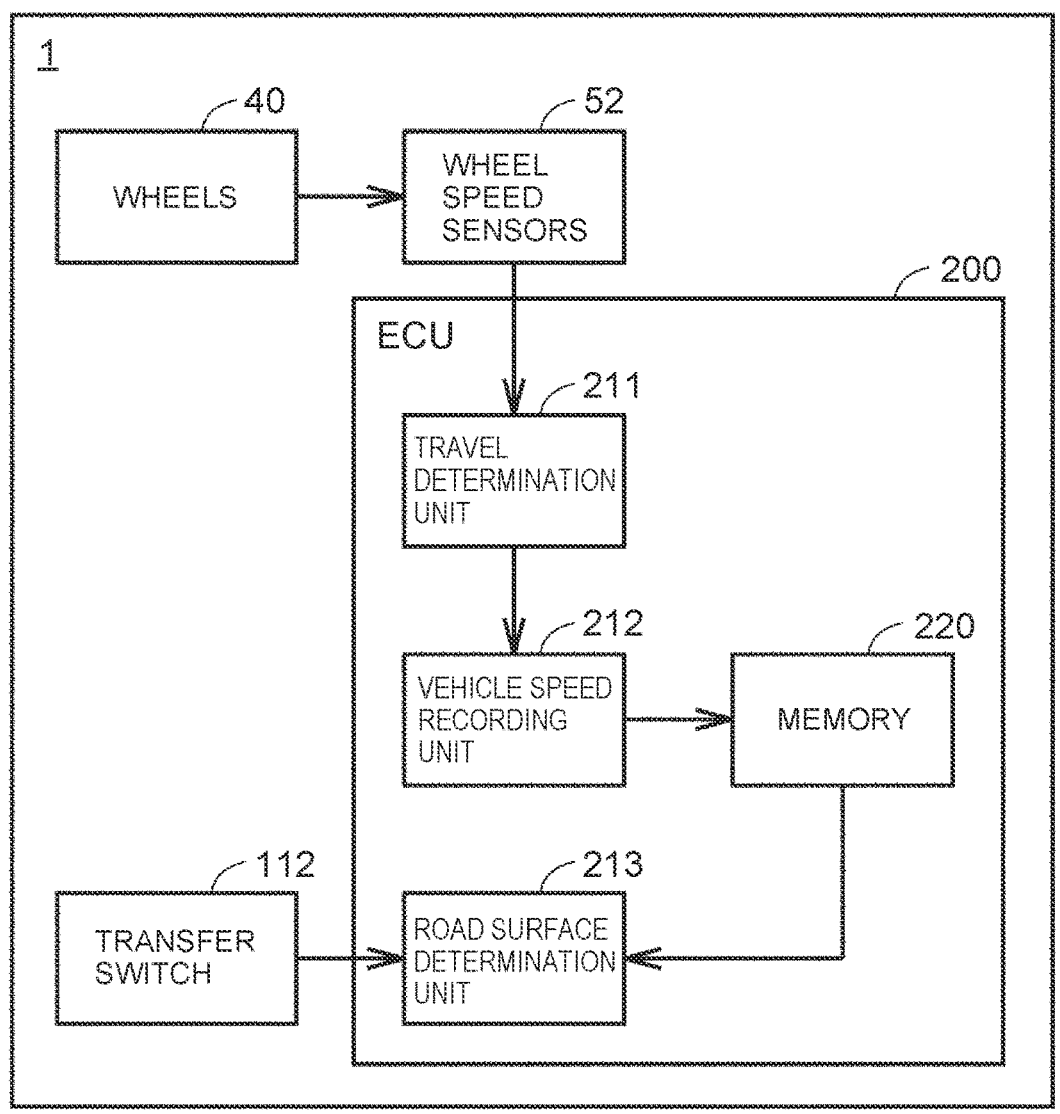
FIG. 5 shows an outline of the configuration of a vehicle in a modification of the first embodiment.

FIG. 5 shows an outline of the configuration of a vehicle 1 in the modification of the first embodiment. With reference to FIG. 5, the ECU 200 includes a travel determination unit 211, a vehicle speed recording unit 212, a memory 220, and a road surface determination unit 213, which are each constituted of a hardware circuit.

As in step S112 of FIG. 2, the travel determination unit 211 calculates a vehicle speed from the rotation speed of the wheels 40 detected by the wheel speed sensor 52, and determines whether the vehicle 1 is in a traveling state or in a stopped state. As in step S113 to step S115 of FIG. 2, when the travel determination unit 211 determines that the vehicle speed is not zero, the vehicle speed recording unit 212 records in the memory 220 a vehicle speed calculated in the section from start to stop of the vehicle 1, if the calculated vehicle speed is a maximum vehicle speed.

As in step S116 to step S119 of FIG. 2, the road surface determination unit 213 estimates whether the road surface is a low stability road surface or a high stability road surface depending on whether or not the maximum vehicle speed of the section is less than the prescribed speed, or whether or not the transfer 100 is put in the low stability road surface mode.

Second Embodiment

In the first embodiment, whether the road surface is a low stability road surface or a high stability road surface is estimated as shown in FIG. 2. In a second embodiment, when the section of the low stability road surface continues, operation of the stop-start system is prohibited.

Figure 6:
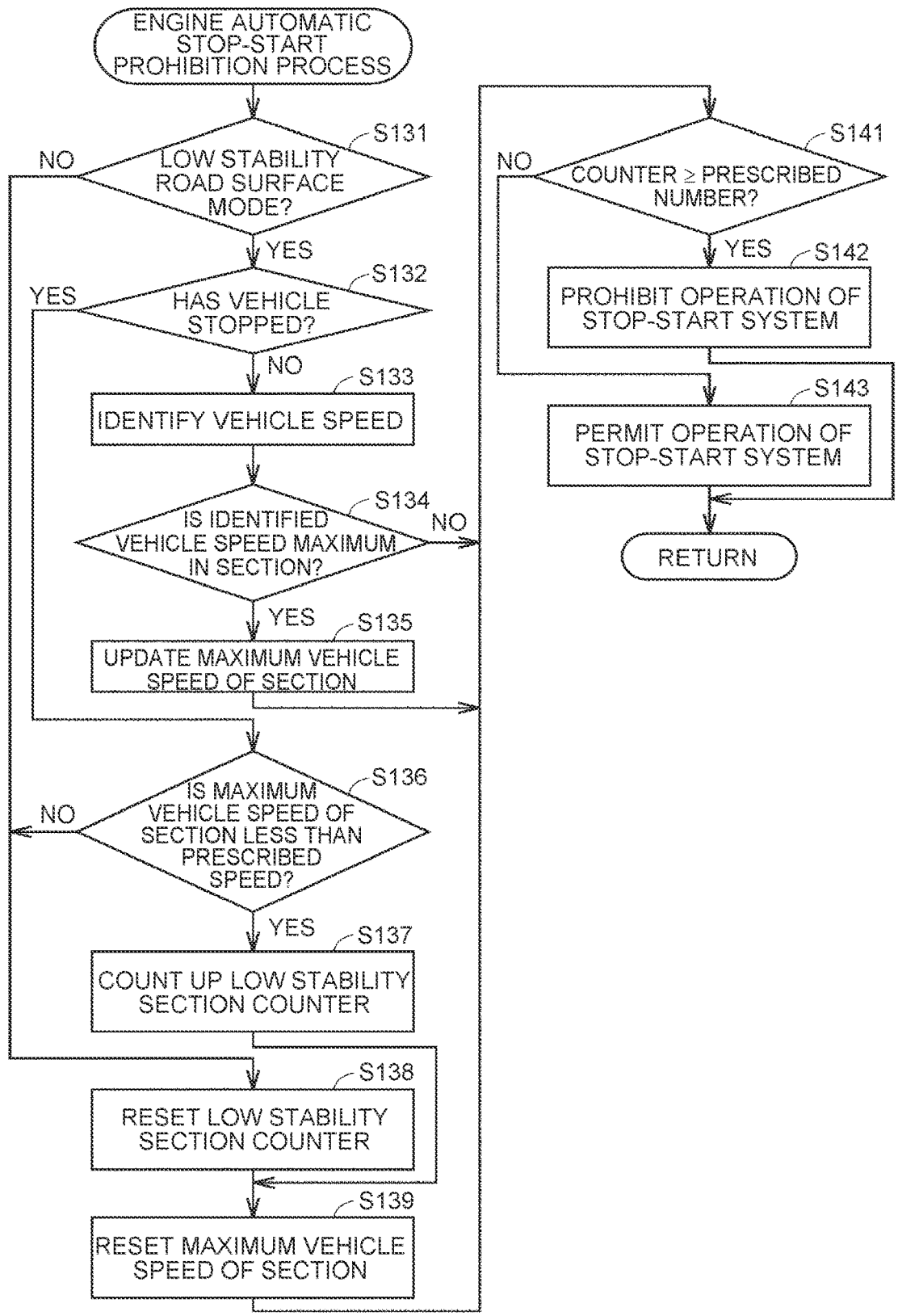
FIG. 6 is a flowchart showing the flow of a engine automatic stop-start prohibition process in a second embodiment.

FIG. 6 is a flowchart showing the flow of a engine automatic stop-start prohibition process in the second embodiment. With reference to FIG. 6, the ECU 200 calls and executes the processes in the stop-start estimation process for every prescribed period in an order from the high-order process. Since the processes of step S131 to step S136 are similar to those of step S111 to step S116 of FIG. 2, redundant description is not repeated.

When it is determined that the maximum vehicle speed of the present section is less than the prescribed speed (YES in step S136), the CPU 210 counts up the value indicated in a low stability section counter (step S137). The low stability section counter is for counting the number of times that the section of the low stability road surface continues.

When it is determined that the maximum vehicle speed in the present section is not less than the prescribed speed (NO in step S136), or when it is determined that the transfer 100 is not switched to the low stability road surface mode (NO in step S131), the CPU 210 resets the value indicated by the low stability section counter to zero (step S138).

After step S137 or step S138, the CPU 210 resets the maximum vehicle speed in the present section to zero (step S139). Next, the CPU 210 determines whether the value indicated by the low stability section counter is equal to or more than a prescribed number (for example, a prescribed integer equal to one or more) (step S141).

When it is determined that the value of the low stability section counter is a prescribed number or more (YES in step S141), the CPU 210 prohibits operation of the stop-start system (step S142). When it is determined that the value of the low stability section counter is not a prescribed number or more (NO in step S141), the CPU 210 permits operation of the stop-start system (step S143). After step S142 or step S143, the CPU 210 returns the process to be executed to the high-order process of the caller of the road surface estimation process.

Figure 7:
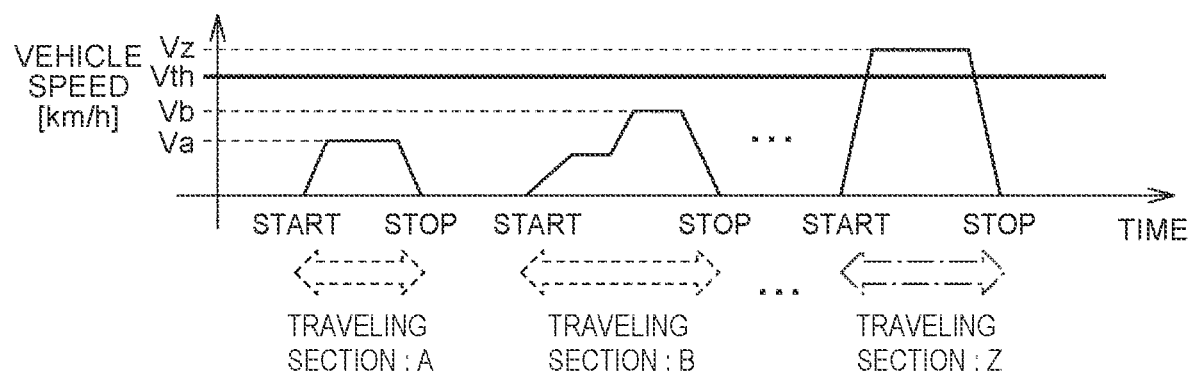
FIG. 7 shows a travel example for illustrating the engine automatic stop-start prohibition process in the second embodiment.

FIG. 7 shows a travel example for illustrating the engine automatic stop-start prohibition process in the second embodiment. With reference to FIG. 7, when the transfer 100 is in the low stability road surface mode during travel in a traveling section A, step S132 to step S135 of FIG. 6 are executed. Eventually, the maximum vehicle speed of the section is updated to Va (km/h).

At the time of stop in the traveling section A, it is determined that the maximum vehicle speed Va (km/h) is less than the prescribed speed Vth (km/h) in step S136 of FIG. 6. Hence, in step S137, the low stability section counter is counted up. For example, in the case where the value of the low stability section counter is one when the prescribed number is one, it is determined in step S141 that the value of the low stability section counter is the prescribed number or more. Hence, in step S142, operation of the stop-start system is prohibited. Accordingly, even when the vehicle 1 stops in the traveling section B or afterward, the engine 10 is not stopped by the stop-start system.

When the transfer 100 is in the low stability road surface mode during travel in a traveling section Z, step S132 to step S135 of FIG. 6 are executed. Eventually, the maximum vehicle speed of the section is updated to Vz (km/h).

At the time of stop in the traveling section Z, it is determined that the maximum vehicle speed Vz (km/h) is not less than the prescribed speed Vth (km/h) in step S136 of FIG. 6. Hence, in step S138, the low stability section counter is reset. When it is determined in step S131 that the transfer 100 is no longer in the low stability road surface mode, the low stability section counter is also reset in step S138. Accordingly, it is determined that the value of the low stability section counter is not a prescribed number or more in step S141, and operation of the stop-start system is permitted in step S143. Hence, in the subsequent section, the stop-start system operates, so that fuel costs can be curved.

Modification of Second Embodiment

In the second embodiment, operation of the stop-start system is prohibited or permitted when the ECU 200 executes the program indicated as the engine automatic stop-start prohibition process shown in FIG. 6, i.e., software. In a modification of the second embodiment, the engine automatic stop-start prohibition process shown in FIG. 6 is implemented by a hardware circuit.

Figure 8:
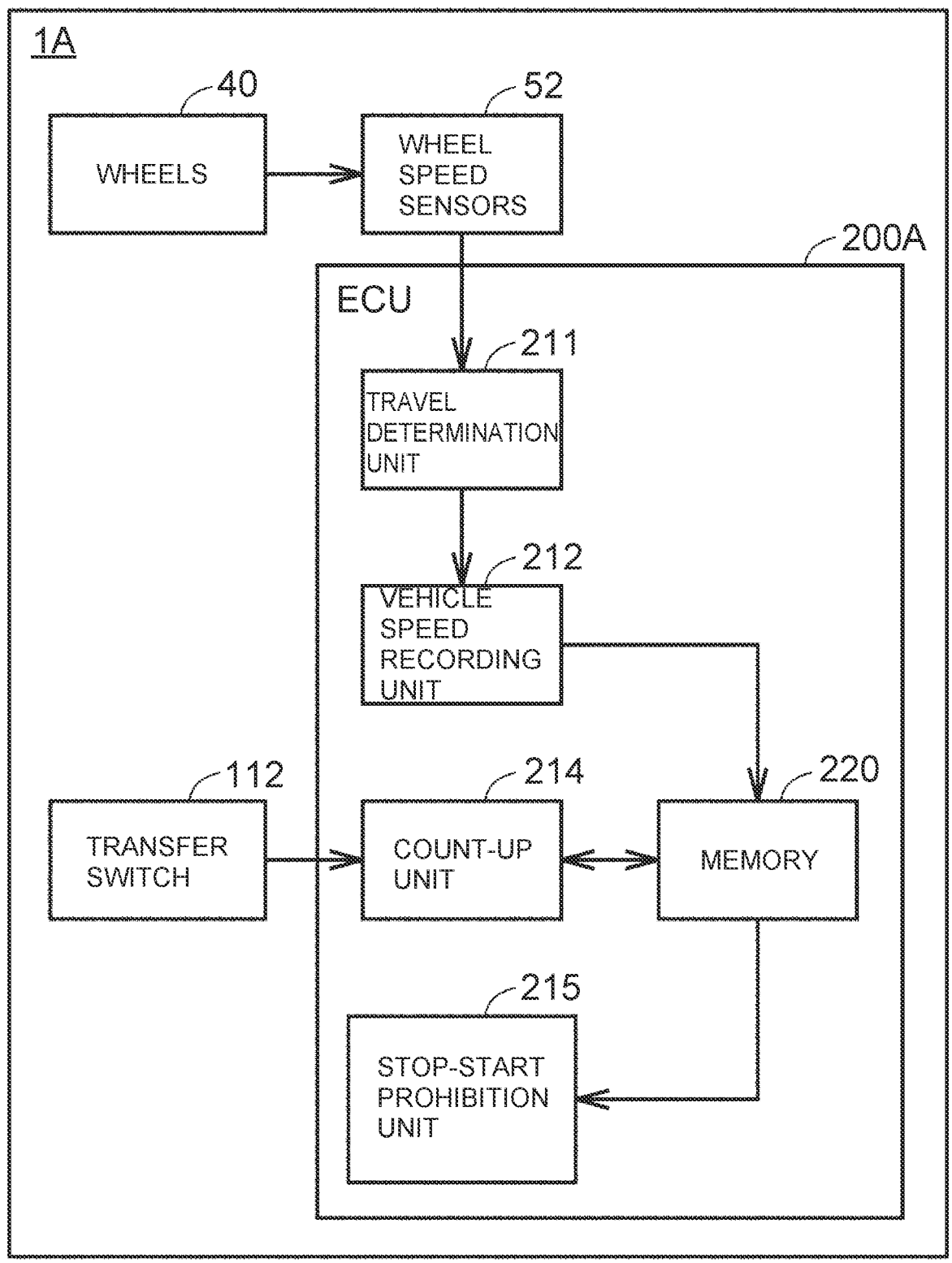
FIG. 8 shows an outline of the configuration of a vehicle in a modification of the second embodiment.

FIG. 8 shows an outline of the configuration of a vehicle 1A in a modification of the second embodiment. With reference to FIG. 8, an ECU 200A includes a travel determination unit 211, a vehicle speed recording unit 212, a memory 220, a count-up unit 214, and a stop-start prohibition unit 215, which are each constituted of a hardware circuit. Since the travel determination unit 211, the vehicle speed recording unit 212, and the memory 220 are illustrated in FIG. 5, a redundant description thereof is not repeated.

As in step S136 to step S139 of FIG. 6, the count-up unit 214 counts up or resets the low stability section counter depending on whether or not the maximum vehicle speed of the section is less than the prescribed speed, or whether or not the transfer 100 is put in the low stability road surface mode.

As in step S141 to S143 of FIG. 6, the stop-start prohibition unit 215 prohibits or permits operation of the stop-start system depending on whether the value of the low stability section counter is a prescribed number or more.

Third Embodiment

In the second embodiment, when the section of the low stability road surface continues, operation of the stop-start system is prohibited. In a third embodiment, when a congested section continues, operation of the stop-start system is prohibited.

Figure 9:
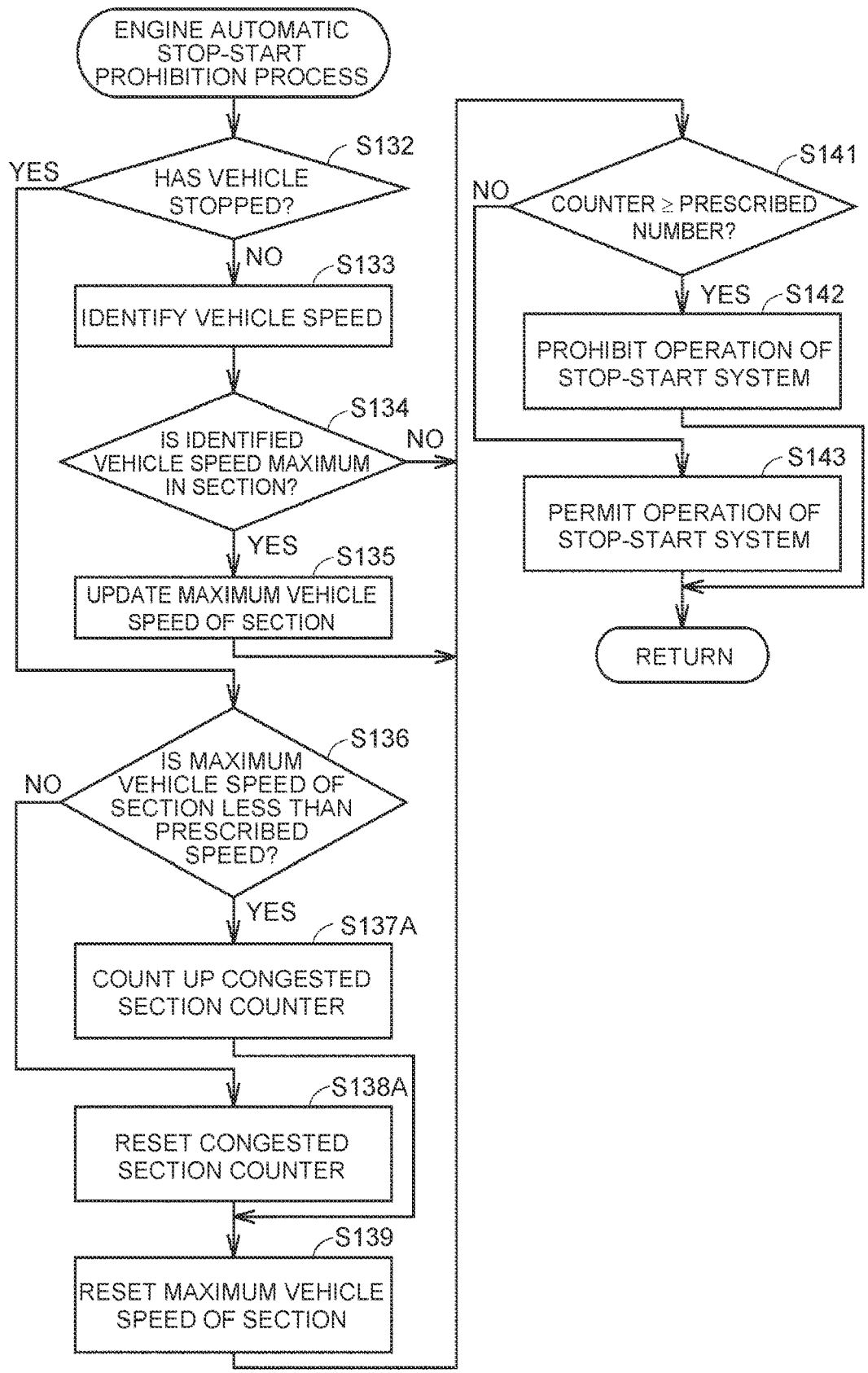
FIG. 9 is a flowchart showing the flow of a engine automatic stop-start prohibition process in a third embodiment.

FIG. 9 is a flowchart showing the flow of a engine automatic stop-start prohibition process in the third embodiment. With reference to FIG. 9, the ECU 200 calls and executes the processes in the stop-start estimation process for every prescribed period in an order from the high order process. Among the steps of FIG. 9, those having the same numbers as the steps of FIG. 6 are identical to the steps in FIG. 6, and therefore, redundant description is not repeated.

When it is determined that the maximum vehicle speed of the present section is less than the prescribed speed (YES in step S136), the CPU 210 counts up the value indicated in a congested section counter (step S137A). The congested section counter is for counting the number of times that the congested section (section from start to stop of a vehicle) continues.

When it is determined that the maximum vehicle speed of the present section is not less than the prescribed speed (NO in step S136), the CPU 210 resets the value indicated in the congestion counter to zero (step S138A). After step S137A or step S138A, the CPU 210 resets the maximum vehicle speed in the present section to zero (step S139).

Other Modifications (1) In the embodiments disclosed, as shown in step S132 to step S135 of FIGS. 2, 6 and 9, the specific situation where low-speed travel of the vehicle 1 is inevitable is determined using the maximum vehicle speed of the section from start to stop of the vehicle 1. However, the present disclosure is not limited to this. As long as the determination is made by using a representative value of the vehicle speed in the section from start to stop of the vehicle 1, the representative value may be other representative values, such as an average of the vehicle speed of the section, and may be a median of the vehicle speed of the section.

(2) In the embodiments disclosed, as shown in S116 of FIG. 2 and step S136 of FIGS. 6 and 9, when the maximum vehicle speed of the section from start to stop of the vehicle 1 is less than a prescribed speed, the finished section and the subsequent section in the future are estimated to be the section with a low stability road surface or the congested section. However, the present disclosure is not limited to the configuration where the finished section and the subsequent section are estimated to be the section with a low stability road surface or the congested section. As long as it is determined that the vehicle 1 is in the specific situation where low-speed travel is inevitable, the sections may be estimated to be in other situations.

(3) In the embodiments disclosed as shown in step S116 and step S117 of FIG. 2, step S136 and step S137 of FIG. 6, step S136 and step S137A of FIG. 9, when it is determined that the representative value of the vehicle speed of the section from start to stop of the vehicle 1 is less than a prescribed speed, the finished section and the subsequent section in the future are estimated to be in a specific situation where low-speed travel is inevitable (for example, the section with a low stability road surface or the congested section).

However, the present disclosure is not limited to this. It is possible to determine whether the number of times of a low-speed section is more than a prescribed number of times, the low-speed section being a section where the representative value is less than the prescribed speed, and determine that the vehicle 1 is in a specific situation where low-speed travel is inevitable, when it is determined that the number of times of the low-speed section is more than the prescribed number of times (a prescribed integer equal to one or more). It can be considered that FIGS. 2, 6 and 9 show examples in which the prescribed number of times is one.

(4) In the embodiments disclosed as shown in step S116 and step S118 of FIG. 2, step S136 and step S138 of FIG. 6, and step S136 and step S138A of FIG. 9, it is determined that the vehicle 1 is no longer in the specific situation, when it is determined that the representative value exceeds the prescribed speed after the vehicle 1 is determined in the specific situation.

However, the present disclosure is not limited to this. It is possible to determine whether the number of times that the high-speed section continues is more than a specific number of times (for example, a prescribed integer equal to one or more), the high-speed section being a section where the representative value exceeds the prescribed speed, and determine that the vehicle 1 is no longer in the specific situation, when it is determined that the number of times that the high-speed section continues is more than the specific number of times after the vehicle is determined to be in the specific situation. It can be considered that FIGS. 2, 6 and 9 show examples in which the specific number of times is one.

(5) In the embodiments disclosed, the wheel speed sensors 52F, 52R are used as sensors for detecting the vehicle speed as shown in FIG. 1. However, the present disclosure is not limited to this. The sensors used for detecting the vehicle speed may be other sensors. For example, a sensor which detects the rotation speed of a rotating part of the engine or the transmission may calculate the vehicle speed, and thereby the vehicle speed may be detected.

(6) In the embodiments disclosed, the section for identifying the representative value is a section from start to stop of the vehicle 1. However, the present disclosure is not limited to this. The section for identifying the maximum vehicle speed may be a section from actual start to stop of the vehicle 1. Examples of the section may include a section from start of the vehicle 1 to stop of idling of the engine 10, a section from restart of the engine 10 to stop of the vehicle 1, a section from restart of the engine 10 to stop of idling of the engine 10, a section after the vehicle speed exceeds 0 km/h until it reaches 0 km/h, and a section after the vehicle speed exceeds a prescribed very low speed (for example, 10 km/h) until it becomes below the prescribed very low speed.

(7) In the embodiments disclosed, the power transmission mechanism 102 of the transfer 100 has a function of switching the four-wheel-drive mode and the two-wheel-drive mode, and a function of switching the High mode and the Low mode. However, the present disclosure is not limited to this. The power transmission mechanism 102 of the transfer 100 may not include the function of switching the four-wheel-drive mode and the two-wheel-drive mode, and may constantly be in the four-wheel-drive mode. The power transmission mechanism 102 of the transfer 100 may not have the function of switching the High mode and the Low mode. A center differential which absorbs a rotation speed difference between the front wheels 40R, 40L and the rear wheels 50R, 50L may be provided. The center differential may be operated based on a control signal from the ECU 200, or the center differential may be locked (to prevent adsorption of the rotation speed difference between the front wheels 40R, 40L and the rear wheels 50R, 50L).

(8) In the embodiments disclosed, as shown in FIG. 1, the switchable travel mode includes the L4 mode. However, the present disclosure is not limited to this. The switchable travel mode may include a specific mode for traveling on the low stability road surface. When the power transmission mechanism 102 of the transfer 100 does not have the function of switching the High mode and the Low mode, the specific mode may be the Low mode. When the transfer 100 is provided with the center differential, the specific mode may be a mode for locking the center differential.

(9) The embodiments disclosed are applicable to the case where the vehicle 1 moves backward in addition to the case where the vehicle 1 moves forward.

(10) The embodiments disclosed have been described as the disclosure of the vehicles 1 and 1A. However, the present disclosure is not limited to this. The embodiments disclosed may be understood as the disclosure of a control device like the ECU 200, and may also be understood as the disclosure of a control method by the control device.

CONCLUSION (1) As shown in FIG. 1, the ECU 200 is a control device for controlling the vehicle 1 including a vehicle speed sensor (for example, wheel speed sensors 52R, 52F). As shown in FIGS. 2, 6 and 9, the ECU 200 identifies a section from start to stop of the vehicle 1 using a vehicle speed detected by the vehicle speed sensor (for example, step S112 of FIG. 2, step S132 of FIGS. 6 and 9). The ECU 200 determines whether the number of times of a low-speed section is more than a prescribed number of times, the low-speed section being the identified section where a representative value of the vehicle speed (for example, a maximum value, an average, and a median of the vehicle speed of the vehicle 1) is less than a prescribed speed (for example, a reference speed used to determine the specific situation where low-speed travel is inevitable) (for example, step S116 of FIG. 2, and step S136 of FIGS. 6 and 9). When it is determined that the number of times of the low-speed section is more than the prescribed number of times, the ECU 200 determines that the vehicle is in a specific situation where low-speed travel is inevitable (for example, step S117 of FIG. 2, step S137 of FIG. 6, and step S137A of FIG. 9).

Accordingly, by simply using the vehicle speed detected by the vehicle speed sensor, it is possible to determine that the vehicle is in the situation where low-speed travel is inevitable, in the case where the low-speed travel section continues, that is, the number of times of the low-speed section is more than a prescribed number of times, the low-speed section being a section from start to stop of the vehicle 1, in which a representative value is less than a prescribed speed. As a result, it is possible to determine the situation where low-speed travel is inevitable, while restraining cost increase.

(2) As shown in FIG. 2, in the specific situation, the vehicle 1 travels on the low stability road surface. Thus, it is possible to determine, while restraining cost increase, the situation where the vehicle 1 is traveling on the low stability road surface, so that the low-speed travel is inevitable.

(3) As shown in FIG. 1, the vehicle 1 further includes a switching device (for example, the transfer switch 112 and the transfer 100) for switching the travel mode to any one mode including the specific mode for traveling on the low stability road surface (for example, L4 mode). As shown in FIGS. 2 and 6, the ECU 200 determines whether the switching device switches the travel mode to the specific mode (for example, step S111 of FIG. 2, and step S131 of FIG. 6), and determines that the vehicle 1 is in the specific situation, when it is determined that the number of times of the low-speed section is more than a prescribed number of times and that the travel mode is switched to the specific mode (for example, step S117 of FIG. 2, and step S137 of FIG. 6).

Accordingly, in the situation where a possibility of traveling on the low stability road surface is high as the travel mode is switched to the specific mode for traveling on the low stability road surface, it is possible to determine, while restraining cost increase, the situation where the vehicle 1 is traveling on the low stability road surface, so that the low-speed travel is inevitable.

(4) As shown in FIG. 9, in the specific situation, the vehicle 1 travels on a congested road. Accordingly, it is possible to determine, while restraining cost increase, the situation where the vehicle 1 travels on the congested road, so that the low-speed travel is inevitable.

(5) As shown in FIG. 1, the vehicle 1 further includes an engine 10, and an engine stop-restart system configured to stop idling of the engine 10 when the vehicle speed lowers to a specific speed, and restart the engine 10 when an operation for moving the vehicle 1 is input. As shown in FIGS. 6 and 9, the ECU 200 prohibits operation of the engine stop-restart system, when it is determined that the vehicle 1 is in the specific situation (for example, step S142 of FIGS. 6 and 9).

Accordingly, when it is determined that the vehicle is in the situation where low-speed travel is inevitable, operation of the engine stop-restart system can be prohibited. As a result, it is possible to prevent a driver from being disturbed by the harmful effects generated by stop of the engine 10 in the situation where low-speed travel is inevitable.

(6) As shown in FIGS. 2, 6 and FIG. 9, the ECU 200 determines whether the number of times that the high-speed section continues is more than a specific number of times, the high-speed section being a section where the representative value is more than the prescribed speed (for example, step S116 of FIG. 2, and step S136 of FIGS. 6 and 9), and determines that the vehicle is no longer in the specific situation, when it is determined that the number of times that the high-speed section continues is more than the specific number of times after the vehicle is determined to be in the specific situation (for example, step S118 of FIG. 2, step S138 of FIG. 6, and step S138A of FIG. 9).

Accordingly, by simply using the vehicle speed detected by the vehicle speed sensor, it is possible to determine that the vehicle is not in the situation where low-speed travel is inevitable, in the case where the low-speed travel section is not continuous, that is, the number of times that the high-speed section continues is more than a specific number of times, the high-speed section being a section from start to stop of the vehicles 1 and 1A, in which the representative value exceeds a prescribed speed. As a result, it is possible to determine the situation where low-speed travel is inevitable, while restraining cost increase.

It should be understood that the embodiments disclosed are in all respects illustrative and are not considered as the basis for restrictive interpretation. The scope of the present disclosure is defined not by the foregoing description but by the range of the appended claims. All changes which come within the range of the claims and meaning and the range of equivalency thereof are therefore intended to be embraced therein.

What is claimed is:

1. A control device for controlling a vehicle, the vehicle including a vehicle speed sensor, an engine and an engine stop-restart system configured to stop idling of the engine, the engine stop-restart system comprising an electronic control unit, the engine, a starter motor and a battery, the control device including a central processing unit (CPU) and a memory and being configured to:
   identify a section from start to stop of the vehicle using a vehicle speed detected by the vehicle speed sensor, wherein the section from start to stop of the vehicle is a section having a low stability road surface, and the low stability road surface comprises at least one road surface of a rock road, a V-groove road, a grooved ground, a slope or rubble slope road, a mogul road, a sandy place, a steep slope or a stepped road,
   count a number of times the vehicle enters a low-speed section, the low-speed section being the identified section where a representative value of the vehicle speed is less than a prescribed speed, wherein the prescribed speed is 35 km/h,
   determine that the vehicle is in a specific situation where low-speed travel is inevitable only in response to determining that the number of times the low-speed section is entered exceeds a prescribed number of times, wherein the prescribed number of times is one, and
   prohibit an operation of the engine stop-restart system so as to prohibit stopping the engine in response to determining that the vehicle is in the specific situation.

2. The control device according to claim 1, wherein in the specific situation, the vehicle travels on a low stability road surface.

3. The control device according to claim 2, wherein:
   the vehicle is capable for switching a travel mode to any one mode including a specific mode that is for traveling on the low stability road surface; and
   the control device is configured to
      determine the travel mode is switched to the specific mode, and
      determine that the vehicle is in the specific situation, in which the number of times the low-speed section is entered is more than the prescribed number of times and the travel mode is switched to the specific mode.

4. The control device according to claim 1, wherein in the specific situation, the vehicle travels on a congested road.

5. The control device according to claim 1, wherein:
   the engine stop-restart system is configured to stop idling of the engine where the vehicle speed lowers to a specific speed, and to restart the engine where an operation for moving the vehicle is input.

6. The control device according to claim 1, wherein the control device is configured to
   determine a number of times that a high-speed section continues is more than a specific number of times, the high-speed section being a section where the representative value exceeds the prescribed speed, and
   determine that the vehicle is no longer in the specific situation in which the number of times that the high-speed section continues is more than the specific number of times after the vehicle is determined to be in the specific situation.

\* \* \* \* \*